(12) United States Patent
Faita et al.

(10) Patent No.: US 7,282,284 B2
(45) Date of Patent: Oct. 16, 2007

(54) METHODS FOR OPERATING FUEL CELLS FED WITH A GAS CONTAINING HYDROGEN AND CARBON OXIDE, AND DEVICES RELATING THERETO

(75) Inventors: Giuseppe Faita, Novara (IT); Enrico Ramunni, San Donato Milanese (IT)

(73) Assignee: Nuvera Fuel Cells Europe S.R.L., Milan (IT)

( * ) Notice: Subject to any disclaimer, the term of this patent is extended or adjusted under 35 U.S.C. 154(b) by 547 days.

(21) Appl. No.: 10/467,256

(22) PCT Filed: Mar. 6, 2002

(86) PCT No.: PCT/EP02/02469

§ 371 (c)(1),
(2), (4) Date: Aug. 5, 2003

(87) PCT Pub. No.: WO02/071519

PCT Pub. Date: Sep. 12, 2002

(65) Prior Publication Data

US 2004/0096710 A1    May 20, 2004

(30) Foreign Application Priority Data

Mar. 6, 2001    (IT) .......................... MI2001A0459

(51) Int. Cl.
*H01M 8/04*    (2006.01)

(52) U.S. Cl. .......................................... 429/13; 429/12
(58) Field of Classification Search .................. 429/12, 429/13, 30, 34, 36, 21, 25, 31, 32

See application file for complete search history.

(56) References Cited

U.S. PATENT DOCUMENTS

| 4,310,605 A | 1/1982 | Early et al. |
| 4,910,099 A * | 3/1990 | Gottesfeld .................... 429/13 |
| 5,432,021 A | 7/1995 | Wilkinson et al. |

(Continued)

FOREIGN PATENT DOCUMENTS

DE    19646354    6/1998

(Continued)

*Primary Examiner*—Patrick Joseph Ryan
*Assistant Examiner*—Monique Wills
(74) *Attorney, Agent, or Firm*—Finnegan, Henderson, Farabow, Garrett & Dunner, L.L.P.

(57) ABSTRACT

The invention describes a method and the relevant devices for permitting an operation stable with time of a stack of membrane fuel cells fed with air and a gas containing hydrogen and at least 100 ppm of carbon monoxide, characterised in that it provides for an oxidising condition at the anodes of said cells in a self-adjusting continuous way or sequentially discontinuous way. Different embodiments of the invention are illustrated wherein the oxidising condition is obtained by adding to the gas containing hydrogen and carbon monoxide, oxygen produced in an electrolysis cell integrated to the fuel cell stack, or by flowing air through porous areas obtained in the bipolar plates or by resorting to high gas diffusion rate membranes, wherein the air flow rate is regulated in both cases by adjusting the pressure differential existing between air and the gas containing hydrogen and carbon monoxide. According to a further embodiment of the method of the invention, the oxidising condition is obtained by sequentially short-circuiting the fuel cell stacks provided with external contacts connected to a control unit.

18 Claims, 7 Drawing Sheets

U.S. PATENT DOCUMENTS 5,521,020 A 5/1996 Dhar
6,156,451 A 12/2000 Banerjee et al.
6,210,820 B1 4/2001 Knights et al.
2002/0192523 A1* 12/2002 Cisar et al. .................. 429/32

FOREIGN PATENT DOCUMENTS

| | | |
|---|---|---|
| DE | 19930872 | 1/2001 |
| EP | 0926754 | 6/1999 |
| EP | 0982788 | 3/2000 |
| EP | 1001666 | 5/2000 |
| WO | 0024075 | 4/2000 |
| WO | 0215309 | 2/2002 |

* cited by examiner

METHODS FOR OPERATING FUEL CELLS FED WITH A GAS CONTAINING HYDROGEN AND CARBON OXIDE, AND DEVICES RELATING THERETO

This application is a 371 of PCT/EP02/02469 filed Mar. 6, 2002.

The present invention concerns methods for operating fuel cells fed with a gas containing hydrogen and carbon oxide, and devices relating thereto.

BACKGROUND OF THE INVENTION

Fuel cells have long been known as electrochemical devices suitable for permitting the direct conversion of free energy from chemical reactions into electrical energy. As such, the fuel cells are not affected by the typical limitations of the Carnot cycle, their energy conversion efficiency is intrinsically higher than that of systems based on fuel combustion, such as motors of the Otto and Diesel type and generally all the burners used for example in civil and industrial heating systems. Further, the operation of fuel cells is characterised by the absence of noxious emissions, such as carbon oxide, aromatic polynuclear hydrocarbons, nitrogen oxide and powders which conversely are a constant of the internal combustion systems. These two positive characteristics and the problem, now universally recognised, of the progressive decay of the environment quality primarily in large urban agglomerates have recently increased the interest for fuel cells for which today new advanced construction materials are available for the internal critical parts as well as new production methods with a sound possibility of mass production under limited costs.

Among the various known types, membrane fuel cells seem to be quite close to the commercial application stage. These cells are essentially made of two porous electrodes provided with suitable catalysts and comprise an interposed thin proton conductive membrane. This assembly is included between two conductive plates having the multiple function of feeding the reactants to the two electrodes, preventing release of the reactants to the external environment and recovering the electrical energy produced by the chemical reactions promoted by the catalysts. A multiplicity of cells is assembled to form a real battery, currently known as "stack", with the aim of obtaining the high current densities required by conventional applications. For the proper operation of this type of stack, the proton conducting membrane must exhibit a high conductivity in order to minimise the electric energy losses due to the ohmic drops. Currently available membranes are based on sulphonated polymers, and especially perfluorinated polymers, and must be maintained in a highly hydrated condition. This goal is achieved by limiting the operating temperature to 60-90° C. and feeding the above mentioned gases only after suitable humidification.

The reactants which permit the operation of membrane stacks consist of gas containing oxygen, advantageously air, fed to positive polarity electrodes, the cathodes, and of gas containing hydrogen fed to negative polarity electrodes, the anodes. As concerns air, while obviously no supply limitations are faced, the only problems are connected to the need for abating the powders and to the pressure level which, in particular for automotive applications is preferably higher than the atmospheric pressure. As concerns hydrogen, it may be supplied as pure gas under pressure in bottles or as low temperature liquid in particular containers with a highly efficient thermal insulation. However, the availability of pure hydrogen is not immediate today and certainly represents a decisive obstacle to the fuel cells diffusion at least for mass applications, such as stationary applications for the generation of electric energy and heat in civil and industrial buildings and for automotive applications. These applications attain the largest industrial interest, a fact that justifies the paramount financial effort required for the development and for the subsequent demonstration phase. For this reason the technology is today oriented towards the on-site production of hydrogen by means of the known endothermic or autothermic reforming processes from hydrocarbons such as methane, LPG, gasoline, and alcohol such methanol or ethanol. Therefore the fuel cell system herein considered consists of the stack, the reforming reactors, auxiliary components such as the fans/compressors, circulation pumps, heat exchangers, valves and the control electronics.

The steam reforming reaction between hydrocarbon or alcohol and water in a first high temperature step produces a mixture of hydrogen, carbon monoxide, carbon dioxide, water and in some cases nitrogen, which are subsequently converted at a lower temperature into hydrogen, carbon dioxide, residual water and in some cases nitrogen (operation commonly known as "CO-shift"). This final mixture still contains small quantities of carbon monoxide, generally comprised between 0.5 and 1% depending on the conditions adopted during the CO-shift phase.

While carbon dioxide has no negative effect, conversely the presence of carbon monoxide (CO) represents a serious problem for the regular operation of the catalysts incorporated into the anodes of the stack, as CO is capable of adsorbing onto the active sites which are thus made no more available for the necessary reaction with hydrogen. At the operating temperature of prior art membrane fuel cells, typically 60-90° C., adsorption is particularly intense and is eliminated only when the content of CO in the gas coming from the reforming unit is extremely reduced, in particularly below 10 parts per million (ppm). This result is achieved immediately downstream the CO shit unit in an additional selective oxidation reactor provided with very specialised catalysts: the gas containing hydrogen, carbon dioxide, water, in some cases nitrogen, and about 0.5-1% of CO, after the addition of suitably tailored quantities of air, is injected inside the reactor where the oxygen contained in the air oxidises the CO to carbon dioxide. This device is negatively affected by a series of inconveniences, and precisely: loss of hydrogen, which, even if only partially, combines with oxygen to form water, with consequent temperature increases dangerous for the selective oxidation reactor, dilution with nitrogen contained in the air, criticality of the regulation, casting doubts on the reliability of operation with time, possible loss of control in the case of heavy peaks of CO contents which may reach the stack, with additional costs for the system.

An alternative solution for operating membrane fuel cells also with reforming gas containing CO concentrations exceedingly higher than the critical limit of 10 ppm is described by R. A. Lemons in the Journal of Power Sources, 29 (1990), page 251: the reforming gas with the addition of suitable quantities of air immediately upstream the stack exhibit performances very close to those obtained with a similar gas totally free from CO.

However, also the method disclosed by Lemons requires a very accurate regulation system which may prove to be not completely reliable with time and which certainly increases the costs of the overall system. A possible failure of the air injection device may entail dramatic consequences such as the possibility of causing a temperature increase at the anodes with the possible irreversible deactivation of the catalyst and in the worst case the formation of explosive hydrogen-oxygen mixtures inside the stacks. An alternative embodiment of this concept, which permits to avoid the air flow regulation devices, is described in DE 19646354. The oxygen necessary for the oxidation of carbon monoxide is produced in a water electrolysis cell and is added to the gas containing hydrogen and carbon monoxide: in this case the percentage of oxygen is maintained constant even when the output of electric energy produced by the stack varies, by suitably adjusting the current fed to the water electrolysis cell. It is therefore necessary to resort to a suitable regulation device which again brings forth costs and problems similar to the aforementioned problems connected to the regulation of the injected air flow. DE 19710819 describes a method for reactivating a fuel cell affected by a performance failure due to the carbon monoxide present in the gas containing hydrogen, which method is based on the periodical short-circuiting of the cell during operation. It may be assumed that during short-circuiting the anode undergoes an increase of its electrochemical potential up to a level wherein the water present at the anode-membrane interface is converted into OH. and O: radicals adsorbed onto the surface of the catalyst particles. These radicals are able to transform the carbon-monoxide blocking the catalytic sites into inert carbon dioxide which is desorbed. At the end of the short-circuiting the catalyst may thus operate regularly; however, in the absence of a continuous protection, the performances are spoiled again. This involves the need for periodically repeating the short-circuiting step. It is obvious that this method applied to a stack operating in a commercial system would cause periodical variations of the current output, a fact unacceptable for the user.

To overcome the problems connected with the above illustrated methods, a large part of the efforts for developing the membrane fuel cell technology have been focused on the optimisation of anodic catalysts intrinsically resistant to the presence of CO concentration of at least 100 ppm in the gas coming from the reforming and CO shift units. These catalysts are made of platinum mixed with other noble or non noble metals, such as for example ruthenium and molybdenum, the latter described in U.S. Pat. No. 6,165,636. The principle on which these formulations are based is presumably twofold: weakening the CO adsorption energy and strengthening the hydrogen absorption energy, thanks to the electronic structures of these alloys, and enhancing the formation of absorbed oxidising species, such as OH., on the catalytic sites supplied by the added metal, as in the case of ruthenium and molybdenum. These catalysts appear to be rather delicate: for example molybdenum may undergo an irreversible oxidation which destroys all its resistance properties under an excessive current output or when a problem in maintaining the reforming gas flow rates is experienced. In the most favourable hypothesis, the data so far available indicate that the approach based on catalysts resistant to poisoning will permit to use gases containing up to about 100 ppm of CO: in this case the reforming and CO shift units will have to be equipped with the selective oxidation reactor, even if the required guarantees as concerns the purity of the produced gas may be less severe, with simplification of the design. However the possibility of damages in case of strong anomalies affecting the composition during shut-downs or performance failures is not yet eliminated, and its elimination requires for additional controls onto the stack and/or the reforming and CO shift reactors.

A further approach to the solution of the problem of poisoning due to carbon monoxide foresees the operation of membrane fuel cells stacks at substantially higher temperatures than the previously specified values of 60-90° C. For example at 150-180° C. the adsorption of carbon monoxide is practically negligible and reforming gas containing even 0.5-1% carbon monoxide may be directly used without any pre-treatment. Membranes capable of operating satisfactorily under these conditions are presently under study and, taking into account the problems to be solved, such as mechanical stability and acceptable electrical conductivity with low hydration levels, it will take a long time for the first commercial applications.

The critical analysis of the above illustrated prior art shows that today there is a strong need for devices and methods for feeding the stack with gas containing high concentrations of CO, by far higher than 100 ppm, in a simple, intrinsically reliable and reasonably not expensive way.

DESCRIPTION OF THE INVENTION

The present invention discloses the methods and the relevant devices for operating a stack made of a multiplicity of proton conductive membrane fuel cells fed on the cathode side with air and on the anode side with a gas containing hydrogen and carbon monoxide, for example a gas obtained by endothermic or autothermic steam reforming of hydrocarbons or alcohols. The devices of the invention are based on a common principle consisting in subjecting the anodes of the stack, under completely safe conditions, to oxidation by means of a simple and self-regulated system without resorting either to complex and expensive equipment or to catalysts with a sophisticated formulation, wherein said oxidation involves the conversion of the adsorbed carbon monoxide to inert carbon dioxide.

In particular the invention comprises in a first embodiment at least a water electrolysis cell integrated into the stack, or in a second embodiment fuel cells comprising conductive plates having a controlled porosity and the anode/membrane/cathode assemblies interposed in-between, or in a third embodiment membranes exhibiting an enhanced oxygen diffusion, or in a fourth embodiment a sequential periodical short-circuiting system for fuel cell stacks.

DETAILED DESCRIPTION OF THE INVENTION

Figure 1:
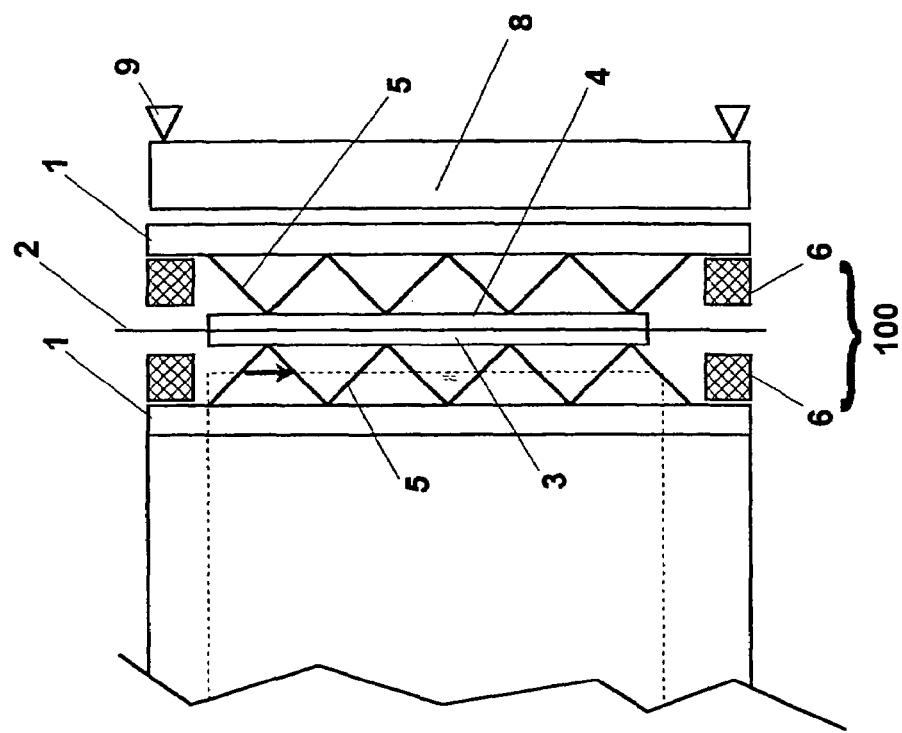
FIG. 1 schematises a cross-section of a stack according to the first embodiment of the present invention comprising a multiplicity of fuel cells and a water electrolysis cell mechanically assembled according to the design known as filter-press configuration and electrically connected in series.
Figure 1:
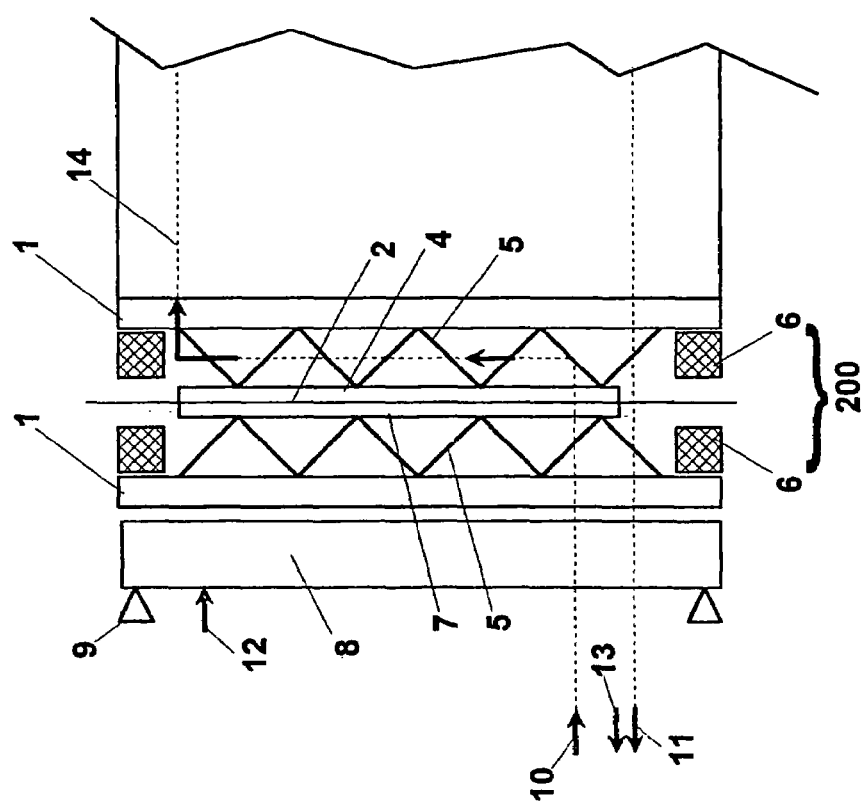

The first embodiment of the invention is represented by the device of FIG. 1 which illustrates a stack comprising a multiplicity of fuel cells (100), only one of which is illustrated in the figure, each cell is delimited by a pair of conductive plates (1) commonly defined as bipolar plates, and a water electrolysis cell (200), mechanically assembled in an arrangement known as filter-press configuration, and electrically connected in series. The assembly of cells (100) and (200) is maintained under compression by tie-rods schematised in (9), abutting against the end-plates (8) having a high thickness and rigidity. Each fuel cell contains a proton exchange membrane (2) in intimate contact with a gas diffusion anode (3) and a gas diffusion cathode (4) and two porous current collectors (5) acting also as gas distributors onto the surfaces of (3) and (4). The collectors (5) maintain the membrane/anode/cathode assembly in electrical contact with the bipolar plates (1). The portion of each fuel cell containing the anode (3) is crossed by a gas containing hydrogen previously saturated with water vapour, in particular a reforming gas, fed in (10), while the portion containing the cathode 4 is crossed by air fed in (12). The exhaust gas containing hydrogen and the air are discharged respectively through (11) and (13). During operation hydrogen is converted into electrons (electric current) and protons which migrate through the membrane towards the cathode where they react with the oxygen contained in the air forming water. The peripheral gaskets (6) prevent release of the gas contained inside each cell (100) into the surrounding environment.

The water electrolysis cell (200) has a structure similar to that of the fuel cells (100) with a pair of bipolar plates (1) including a membrane (2)/anode (7)/cathode (4) assembly maintained in electrical contact with bipolar plates (1) by means of the current collectors (5). The difference with respect to the fuel cell is that the gas containing hydrogen previously saturated with water vapour crosses the portion of cell containing the cathode (4), which may have the same structure as the air diffusion cathode contained in the fuel cells (dotted line in (200)) and is then sent to the fuel cells (100) through the collector-distributor (14). The portion of cell (200) containing the anode (7) is not fed with any gas, or alternatively is fed with a minimum flow of air. During operation the water transported by the gas containing hydrogen hydrates the membrane and is electrolysed at the anode (7) with the formation of oxygen and protons. Oxygen, leaving the portion of cell (200) containing the anode mixes to the flow of gas containing hydrogen which, after crossing the other portion of the cell enters the collector distributor (14). The protons migrate through the membrane (2) towards the cathode (4) wherein they form hydrogen which mixes to the flow of feed gas containing hydrogen. Optionally also liquid water may be injected into the cell (200) to help in maintaining the hydration of the membrane (2) through a duct not shown in FIG. 1. The oxygen evolution at the anode (7) causes strongly oxidising conditions which can certainly destroy the active carbon utilised as a support for the catalysts used for the production of the gas diffusion anodes and cathodes (3) and (4). For this reason the catalyst of the anode (7) must be made of a mixture of micro-particles of pure platinum, or even better by an alloy or platinum and iridium and a chemically resistant polymeric binder, preferably a perfluorinated polymer.

The current passing through the cell (200) produces a defined quantity of oxygen on the basis of the well known Faraday law and is necessarily the same that passes through the fuel cells (100) of the stack, connected in electrical series to cell (200). Further, as the flow rate of the gas containing hydrogen is regulated in a proportional manner with respect to the current output, consequently the oxygen percent in the gas containing hydrogen depends only on the ratio between the number of electrolysis cells (200) and the number of fuel cells (100) forming the stack. Thus, in practice, the percent of oxygen in the gas containing hydrogen is predefined around the value considered as the optimum when assembling the stack and is regularly kept at the same level during operation without the need for additional controls apart those obviously required for the regulation of the flow rate of the gas containing hydrogen.

As an example used only with a demonstration purpose and by no means intended as a limitation of the invention, a stack comprising 100 cells provided with only one electrolysis cell was fed with a gas obtained by reforming of liquid hydrocarbons, saturated with water vapour at 80° C., with a pressure of 2 bars absolute and containing in addition to the water vapour about 55% by volume of hydrogen, 20% by volume of carbon dioxide and 1000 ppm of carbon monoxide. With a reforming gas flow rate 20% higher than the stoichiometric value of the reaction, the percent of oxygen injected thanks to the electrolysis was 0.4% molar, if referred to the wet gas, equivalent to 0.7% molar with respect to the hydrogen alone and in a molar ratio of 4:1 with respect to the carbon monoxide. Under these conditions, the performances of the stack, fed with air at 2.5 bars absolute, with a stoichiometric excess of 2 and pre-humidification at 70° C., did not show any decay due to the poisoning action of carbon monoxide at various current output values. A likewise result may be obtained for stacks made of 95-105 fuel cells versus one electrolysis cell, wherein the oxygen concentration is 0.38-0.42% molar with respect to the wet gas. The anti-poisoning effect of oxygen was most probably due to its adsorption onto the active sites of the anode catalyst with the formation of adsorbed radicals such as O: and OH., that is species provided with an oxidising action towards carbon monoxide which was then converted into inert carbon dioxide.

It is clear that the oxygen production was missing when the current output was zero; when this occurred, in order to protect the stack the control system was suitably designed to block immediately the passage of the reforming gas through the stack, optionally deviating the same to a suitable by-pass.

Figure 2:
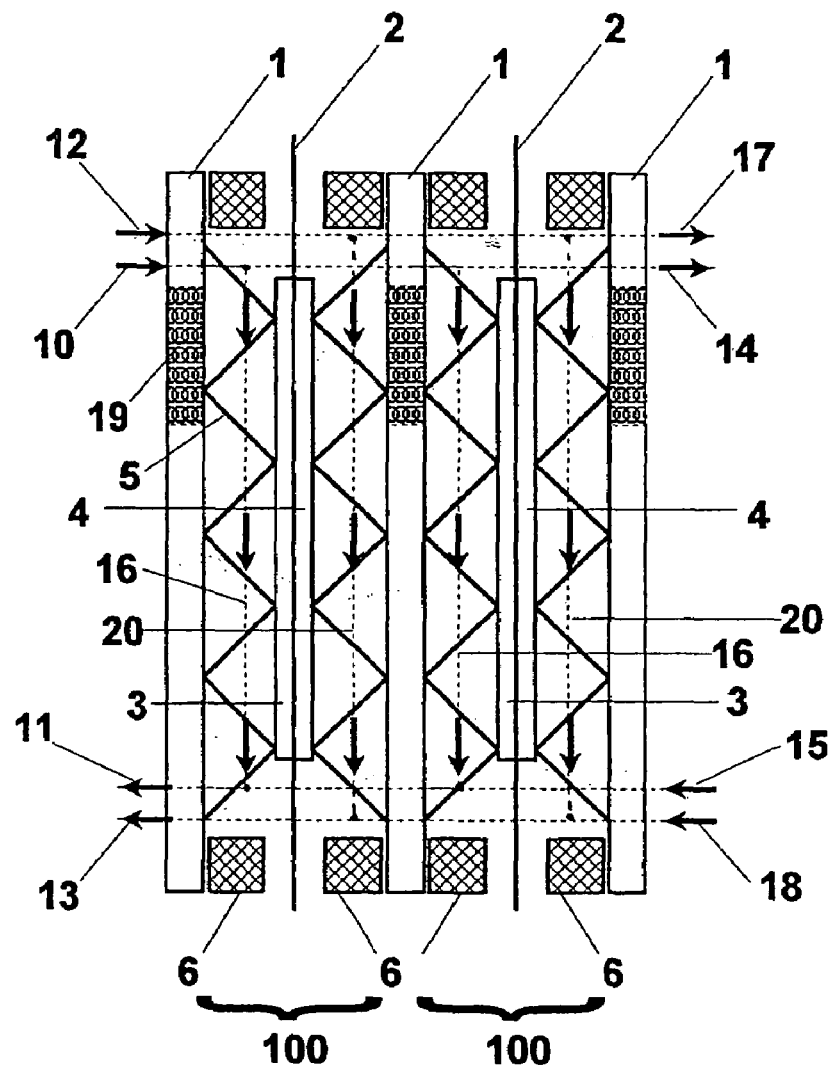
FIG. 2 shows a cross-section of a stack according to the second embodiment of the present invention wherein said stack comprises a multiplicity of fuel cells, each one delimited by conductive plates provided with at least an area with controlled porosity, through which it is possible to inject into the gas containing hydrogen certain amounts of air regulated by the pressure differential between the cathode and the anode.

A second alternative embodiment of the invention is shown in FIG. 2 which schematises a new fuel cell structure (100) for stacks similar to that of FIG. 1, but without electrolysis cells (200). For simplicity sake FIG. 2 illustrates only a pair of cells (100), although it is intended that the complete stack comprises a multiplicity of said cells. Each cell comprises a pair of bipolar plates (1), a proton exchange membrane (2), an anode (3) and a cathode (4) both in intimate contact with the membrane (2), a pair of porous current collectors (5) having the twofold function of providing the electrical contact between the anode, cathode and the respective bipolar plates, and to uniformly distribute the gas containing hydrogen on the surface of the anode (3) and air on the surface of cathode (4) respectively, and a pair of peripheral gaskets (6) which prevent the gas contained inside the cell from being released into the surrounding environment. In its path, the gas containing hydrogen crosses the collector/distributor (14), the portion (16) of the cell comprising the anode (3) and the discharge collector (15). The same path as regards air includes the collector/distributor (17), the portion (20) of cell containing the cathode (4) and the discharge collector (18). The bipolar plates (1) are provided at least in their upper part of an area characterised by a micro-porosity (19) obtained by different methods, for example by inserting sintered metallic material in apertures made in the bipolar plate wall. By maintaining the pressure on the cathode side at a level higher than that of the anode side and suitably regulating the pressure differential, it is possible to vary in a simple way the flow of air through the porous area of the bipolar plate up to reaching the best value which permits to eliminate the poisoning action of the carbon monoxide present in the gas containing hydrogen. Under the same operating conditions described for the stack of FIG. 1 it has been found that a practical resistance to the poisoning action of carbon monoxide is achieved when the oxygen concentration in the exhaust gas containing hydrogen released by the outlet duct of the stack is 0.8-1.2% molar. The regulation of the air injection as a function of the flow rate of the gas containing hydrogen, necessary in case this flow rate falls down to low values when the current output is reduced, is achieved simply by decreasing the air pressure and consequently the pressure differential between cathode and anode on the basis of an easily determined algorithm. It has also been found that the best stability of the air injection is attained when the porous material (19) is made hydrophobic, for example by imbibition with a suspension of PTFE followed by a stabilising thermal treatment. As a conclusion, by operating according to the present alternative embodiment of the invention, there is no more the need for delicate control systems required when the addition of air is carried out outside the stack, as described in the prior art.

Figures 3A, 3B:
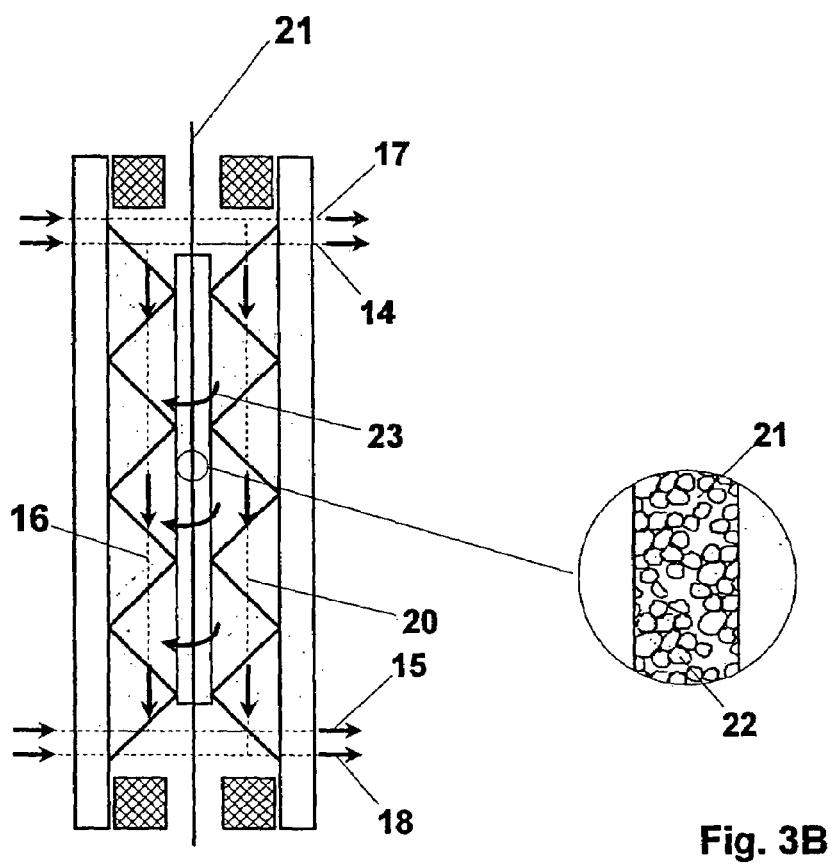
FIG. 3 describes the third embodiment of the invention showing the cross section of a single fuel cell incorporating a proton exchange membrane characterised by an enhanced oxygen diffusion rate achieved for example by embedding into the membrane a suitable quantity of a material with particles exhibiting a high internal porosity. The oxygen diffusion rate, with the same membrane type, is regulated by acting on the value of the anode/cathode pressure differential.

A third embodiment of the invention is illustrated in FIG. 3A representing a cross-section of a single fuel cell essentially made of the same components of the cells of FIGS. 1 and 2. The characterising element of this embodiment is the fact that the proton exchange membrane identified by (21) has a high gas diffusion property. This property, in the presence of an adequate pressure differential between the cathode and the anode (cathode pressure higher than the anode pressure) allows for providing a defined oxygen flow through the membrane towards the anode, schematised by the arrows (23). The high gas diffusion may be obtained in different ways, for example by resorting to very thin membranes which however involve the risk of macroscopic porosity and of short-circuiting between the cathode and the anode, or by using for the production of the membrane ionomers characterised by high solubility for the gases and in particular oxygen, and by high diffusion coefficients (these properties however are in conflict with the need to have membranes with good mechanical characteristics and a high ionic conductivity). A very efficient way to obtain high gas diffusion with a minimum impact on the mechanical and ionic conduction characteristics is illustrated in FIG. 3B which shows a membrane containing particles (22) of a chemically inert material having a high specific surface, that is a high internal micro-porosity.

The increase of the gas diffusion property is most probably due to the possibility that a gas may quickly diffuse through that portion of the micro-pores of particles (22) not occupied by the ionomer during the production of the membrane. As a consequence the path through the polymer, which practically constitutes a barrier, results substantially reduced with an increase of the gas flow, the other conditions remaining the same. A suitable porous material may be any material resistant to the acid conditions typical of proton conducting membranes, where the conduction is obtained through sulphonic groups inserted on the polymeric backbone. Suitable materials have proved to be zirconium oxide, titanium oxide, in general all the oxides of the so-called valve metals, and in particular silica with a specific surface not lower than 27 $m^2/g$, preferably higher than 130 $m^2/g$.

More preferred material for their stability during operation have demonstrated to be micro-porous materials with hydrophobic characteristics such as the powders of polytetrafluoroethylene, probably for their capacity of resisting to flooding of the internal pores by the reaction water formed at the cathode during operation.

With composite membrane of the above described type, gas diffusion increases in a steady way as the micro-porous particles content increases; however it has been found that there is a maximum limit not to exceed to avoid the deterioration of the mechanical characteristics and the decrease of the ionic conductivity of the membrane. The tests carried out by the inventors have demonstrated that in the case of membranes produced with a Nafion® polymer (aqueous solution or 5% hydroalcoholic solution supplied by DuPont, Aldrich or Solution Technology) mixed to silica with a specific surface of 180 $m^2/g$ and average dimensions of 0.007 micrometers, the best compromise among these conflicting requirements is obtained with a content of 2.5-3.5% on the total weight.

Figure 4:
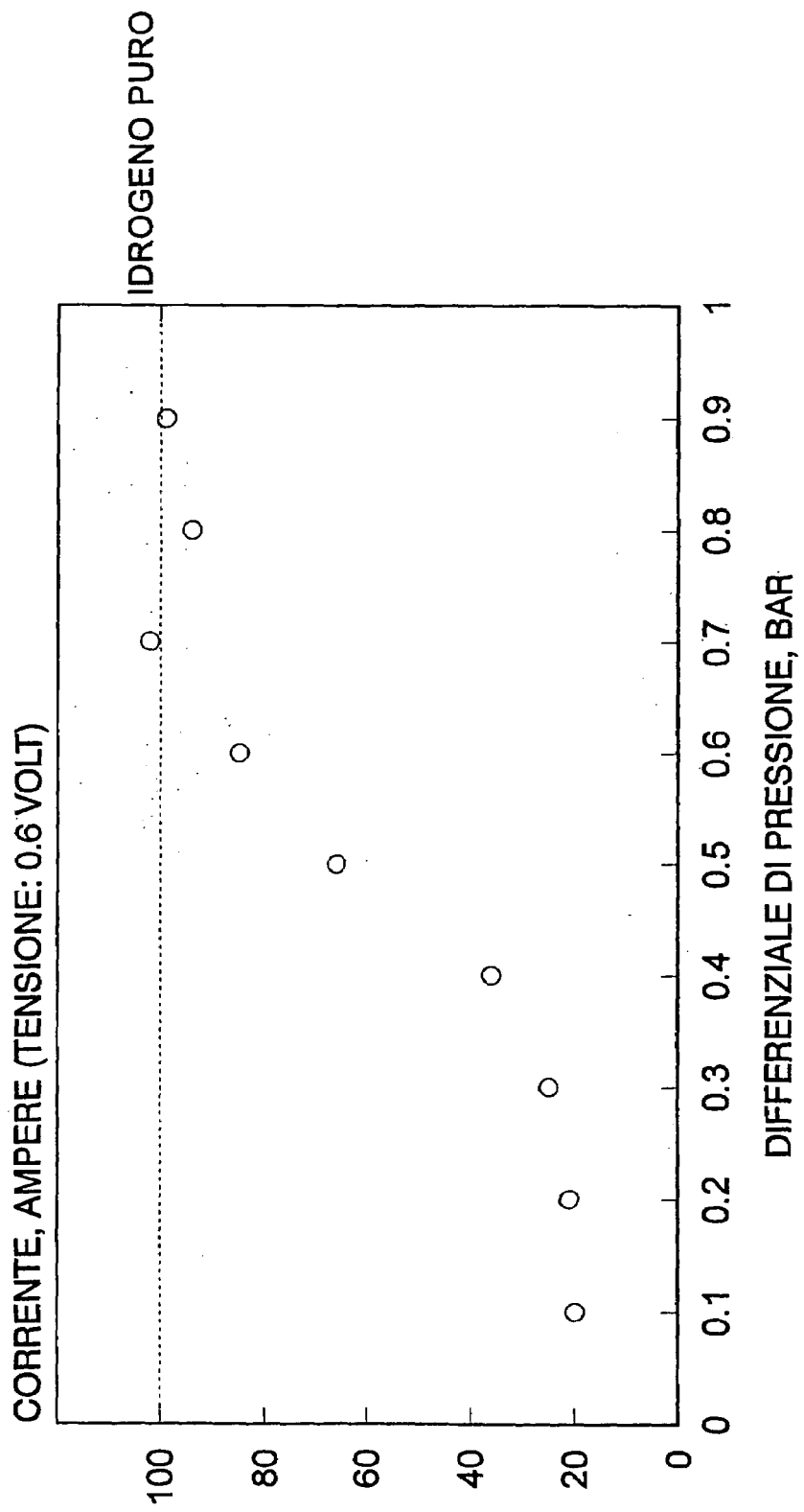
FIG. 4 shows the behaviour of the voltage/current ratio for the cell of FIG. 3 as a function of the anode/cathode pressure differential, when the cell is fed with a reforming gas containing 1000 ppm of carbon monoxide.

FIG. 4 shows the results obtained with a single fuel cell with an active surface of 200 $cm^2$, equipped with a composite Nafion-silica membrane obtained as above described, with a thickness of 40 micrometers. The cell was maintained at a constant pressure of 0.6 V under the same operating conditions given for the stack of FIG. 1, with the only difference that the pressure differential between cathode and anode was set from 0.1 to 0.9 bars. It has been found that with low pressure differentials the current output remains very low, indicatively about 20% with respect to the typical level obtained when feeding a gas free from carbon monoxide (dotted line). When the pressure differential exceeds the limit of 0.3 bars, the current output progressively increases at about 0.7 bars to the same value which may be obtained in the absence of carbon monoxide. In this optimum operating conditions the oxygen present in the discharged exhaust reforming gas is only 0.1%. The efficiency of the protective action against carbon monoxide is therefore much higher than the one detected with the devices of FIG. 1 for which the required oxygen content in the reforming gas is 0.4% measured at the feeding point of the fuel cells. This higher efficiency is probably due to the immediate contact of oxygen, as soon as it emerges from the membrane surface, with the catalyst particles which are positioned exactly at the interface and which are the only ones really determinant for the reaction. Each excess of oxygen would therefore act only onto the catalyst particles positioned in the inner portion of the anode which do not affect in a significant way the performances. Therefore this exceeding quantity of oxygen is not necessary.

It has been found that the composite membranes of the invention are particularly useful for attaining the object of the invention of a practically complete insensibility towards carbon monoxide with minimum levels of oxygen present in the exhaust gas when their air permeability is equal to about 1 ml/hour per $cm^2$, measured at 70-90° C., preferably with a pressure differential of 0.3-1 bars.

Figure 5:
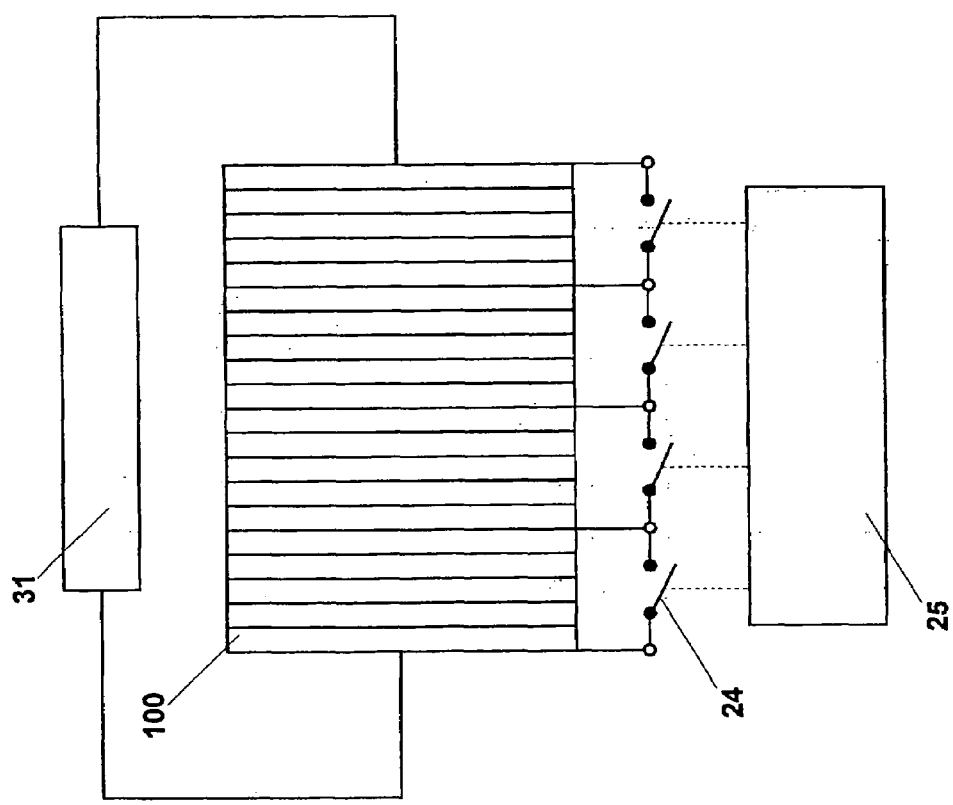
FIG. 5 shows a circuit scheme illustrating a further embodiment of the invention comprising a stack and a sequential short-circuiting device of fuel cells assemblies.

FIG. 5 shows the electrical circuit of the fourth embodiment of the invention, which consists of a stack made of a multiplicity of membrane fuel cells (100), the control system (31) comprising an inverter for the conversion of the continuous current of the stack into alternate current and one or more electric loads, a series of switches (24) the closing of which causes the short-circuiting of a fuel cell package and a control unit (25) which activates closing of the switches in a sequential way and at a defined frequency.

The stack fed with a reforming gas containing 1000 ppm of carbon monoxide at 2 bars and with air at 2.5 bars (the piping is not shown in the figure) releases electric current through the external circuit consisting of (31). Due to the carbon monoxide content in the reforming gas the electric power output progressively decreases unless countermeasures are adopted. In the case of the embodiment of the present invention, the control unit (25) sequentially activates the switches (24): when the first switch is closed, the relevant cell package is short-circuited and consequently the anode potential increases up to practically coincide with the one of the cathode. Such a potential brings forth oxidising conditions onto the anodes with the formation of adsorbed O: and OH. radicals capable of easily oxidising the carbon monoxide to inert carbon dioxide: in this way the anodes of the first cell package are regenerated and the first cell package may be started up again under normal operating conditions. This happens when the control unit opens the first switch and closes the second one which causes short-circuiting of the second package of cells, whose anodes are in turn regenerated as above mentioned. This sequence is repeated until the last switch connected to the last package of cell is operated. With the subsequent opening of the last switch and the closing of the first switch, the sequence is repeated by the control unit.

Figure 6:
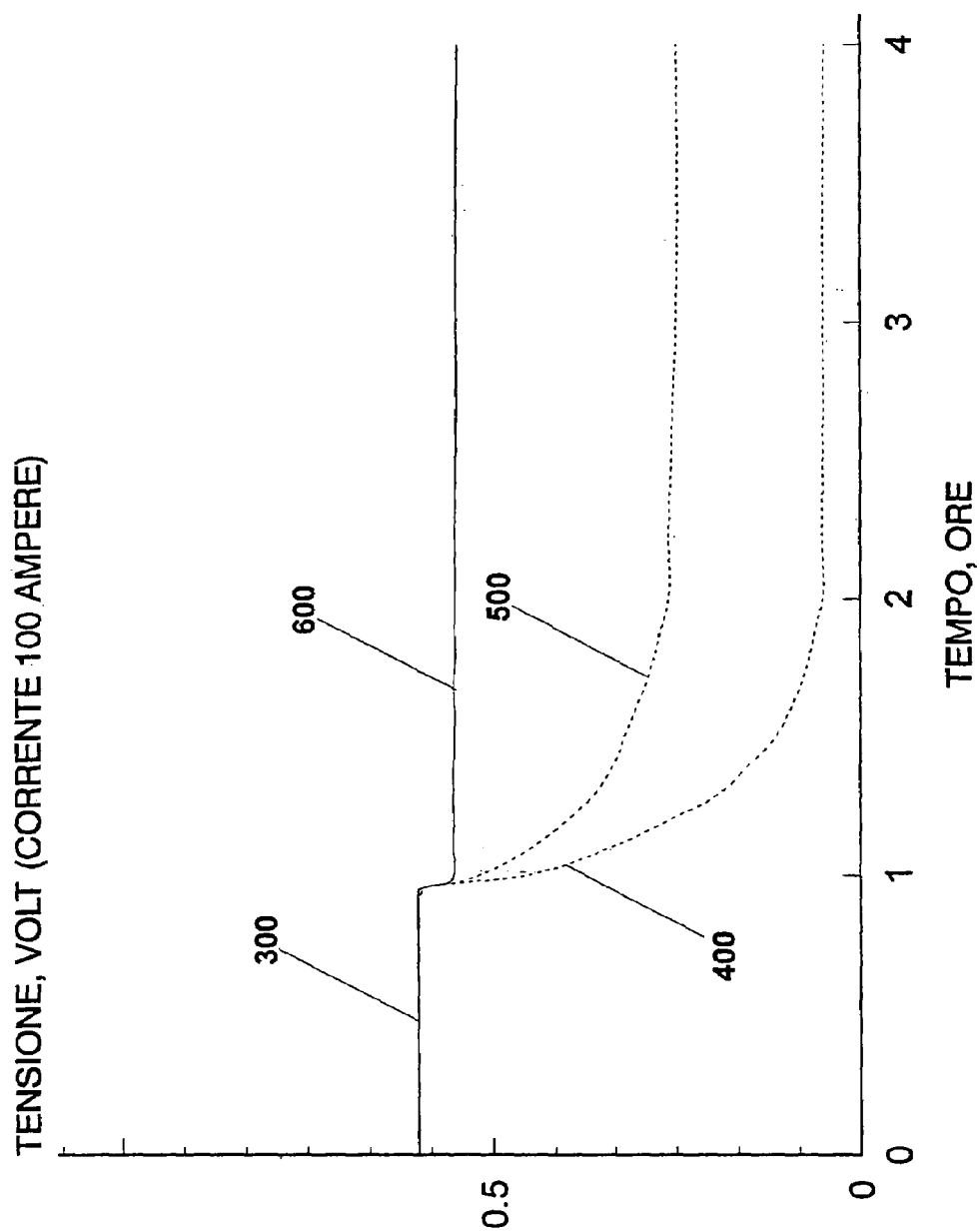
FIG. 6 shows a comparison between the behaviour with time of the average cell voltage in a stack fed with pure hydrogen versus one fed with reforming gas containing 1000 ppm of carbon monoxide and provided with the device of FIG. 5 applied to a cell package or to the single cells.
Figure 7:
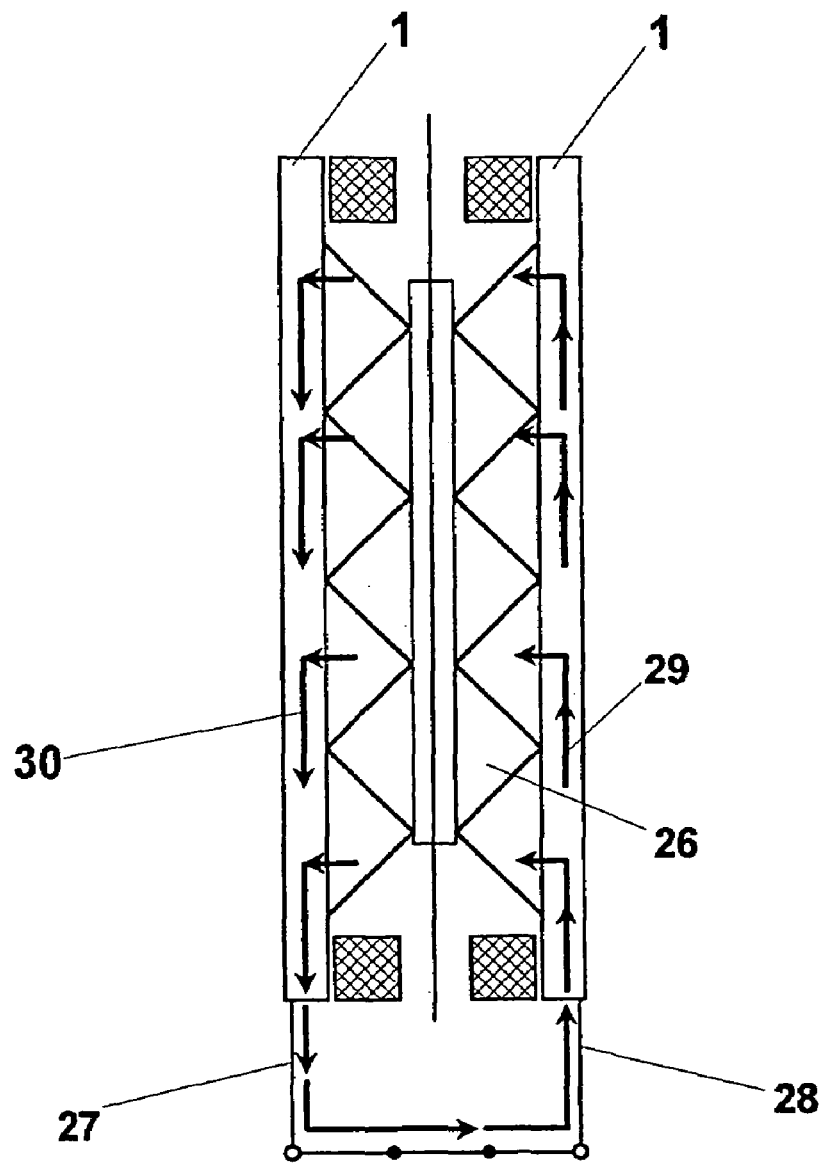
FIG. 7 shows the cross section of a single cell subjected to short-circuiting with the indication of the transversal current paths inside the bipolar plates.

The result of this type of operation is indicated in FIG. 6 which shows the behaviour with time of the average cell voltage for a stack of 100 cells fed with hydrogen free from carbon monoxide (300), the behaviour with time of the average cell voltage for the same stack fed with a reforming gas containing 1000 ppm of carbon monoxide and with sequential short-circuiting of packages of 10 cells (600), the behaviour with time of the average cell voltage for the same stack fed with the same gas but with sequential short-circuiting of single cells as described in the prior art (500) and finally the behaviour with time of the average cell voltage for the same stack fed with the same gas without any countermeasure (400). The comparison between curves (500) and (600) shows that the device of the invention permits to achieve a result by far better than the one typical of the prior art based on sequential short-circuiting of the single cells. In fact, as shown in the scheme of FIG. 7, in a single cell this operation is efficacious only onto the portion (26) of the anode close to the external short-circuiting contacts (27) and (28), while the more internal areas and in particular the most distant are negatively affected by the ohmic drops which, due to the transversal paths (29) and (30) of the electric current withdrawn through the external contacts, are established along the bipolar plates. These ohmic drops are significant due to the reduced thickness of the bipolar plates and to the non negligible resistivity of the materials used for their construction. As these ohmic drops may easily reach values in the range of 0.5 volts, the electrochemical potential of the anodes in the most distant areas with respect to the external contacts, does not increase enough and the reactivation is scarce if not absent.

By operating with packages of cells, the ohmic drops are substantially localised onto the plates of the two terminal cells of each package and disappear on the intermediate cells due to the voltage re-distribution favoured by the various bipolar plates. The consequence of such a behaviour is that each package is substantially regenerated during the sequential short-circuiting at the expense of a decrease of the voltage which remains moderate if the number of cells included in the short-circuited packages, for example 10, is limited over the total number of cells of the stack, for example 100.

The invention claimed is:

1. A method for operating a stack consisting of a filter-press structure comprising a multiplicity of fuel cell stacks, each cell delimited by bipolar plates and comprising an anode-proton conducting membrane/cathode assembly, comprising maintaining said stack at 60-90° C., feeding the anode compartment with a fuel containing hydrogen and at least 100 ppm of carbon monoxide, adding water vapor thereto, flowing the said fuel into the cathode side of at least one membrane electrolysis cell integrated into the filter press structure of the stack, feeding the same electric current as the fuel cells, mixing said fuel with the oxygen produced in the anodic side of said at least one electrolysis cell and feeding the resulting gaseous mixture containing hydrogen, carbon monoxide and oxygen to each anode of the fuel cells, imposing an oxidizing condition to obtain under the same cell voltage a current output stable over time.

2. The method of claim 1 wherein the method comprises excluding automatically said fuel feeding when the current output is interrupted.

3. The method of claim 1 providing the stack with a number of fuel cells comprised between 95 and 105 for each electrolysis cell so that the molar percent of said oxygen mixed to the fuel containing hydrogen and carbon monoxide and added with water vapor is equal to 0.38-0.42 independently from the intensity of said current flowing through the electrolysis cell and the fuel cells.

4. The method of claim 1 wherein said oxidizing condition is obtained by addition of air to the fuel containing hydrogen and carbon monoxide by permeation through a micro-porous area of the bipolar plates.

5. The method of claim 4 wherein said micro-porous area is positioned in the upper portion of said bipolar plates.

6. The method of claim 4 wherein the flow of air permeating through the porous area of the bipolar plates is controlled by regulation of a pressure differential maintained between the air fed to the cathodes and the fuel containing hydrogen and carbon monoxide fed to the anodes.

7. The method of claim 4 wherein said micro-porous areas of the bipolar plates are made hydrophobic.

8. The method of claim 6 wherein said pressure differential is adjusted to produce a molar percentage of oxygen in the exhaust fuel containing hydrogen and carbon monoxide equal to 0.8-1.2.

9. The method of claim 1 wherein said oxidizing condition is obtained by adding air to the fuel containing hydrogen and carbon monoxide by permeation through said membranes of said assemblies.

10. The method of claim 9 wherein the flow rate of said air permeating through said membranes is regulated by acting on the pressure differential maintained between the air fed to the cathodes and the fuel containing hydrogen and carbon monoxide fed to the anodes.

11. The method of claim 9 wherein said membranes are high gas diffusion rate membranes.

12. The method of claim 11 wherein said high gas diffusion rate membranes are proton conducting membranes containing particles of a chemically stable micro-porous material.

13. The method of claim 12 wherein said micro-porous material is selected from the group consisting of silica and valve metal oxides.

14. The method of claim 12 wherein said micro-porous material is a hyrophobic material.

15. The method of claim 14 wherein said hydrophobic material is polytetrafluoroethylene powder.

16. The methodof claim 11 wherein said high gas diffusion rate membrane has an air diffusion rate of 1 ml/hour×$cm^2$ at 70 to 90° C. under a pressure between 0.3 and 1 bar.

17. The method of claim 1 wherein said oxidizing condition is obtained by sequentially short-circuiting fuel cell packages provided with contacts connected to an external control unit.

18. The method of claim 17 wherein the number of fuel cells in said packages is lower by at least a factor of 10 with respect to the total number of fuel cells of the stack.

* * * * *